Sept. 22, 1931.  G. L. CHERRY  1,823,885
METHOD OF AND APPARATUS FOR HANDLING STRAND MATERIAL
Filed April 6, 1929  2 Sheets-Sheet 1
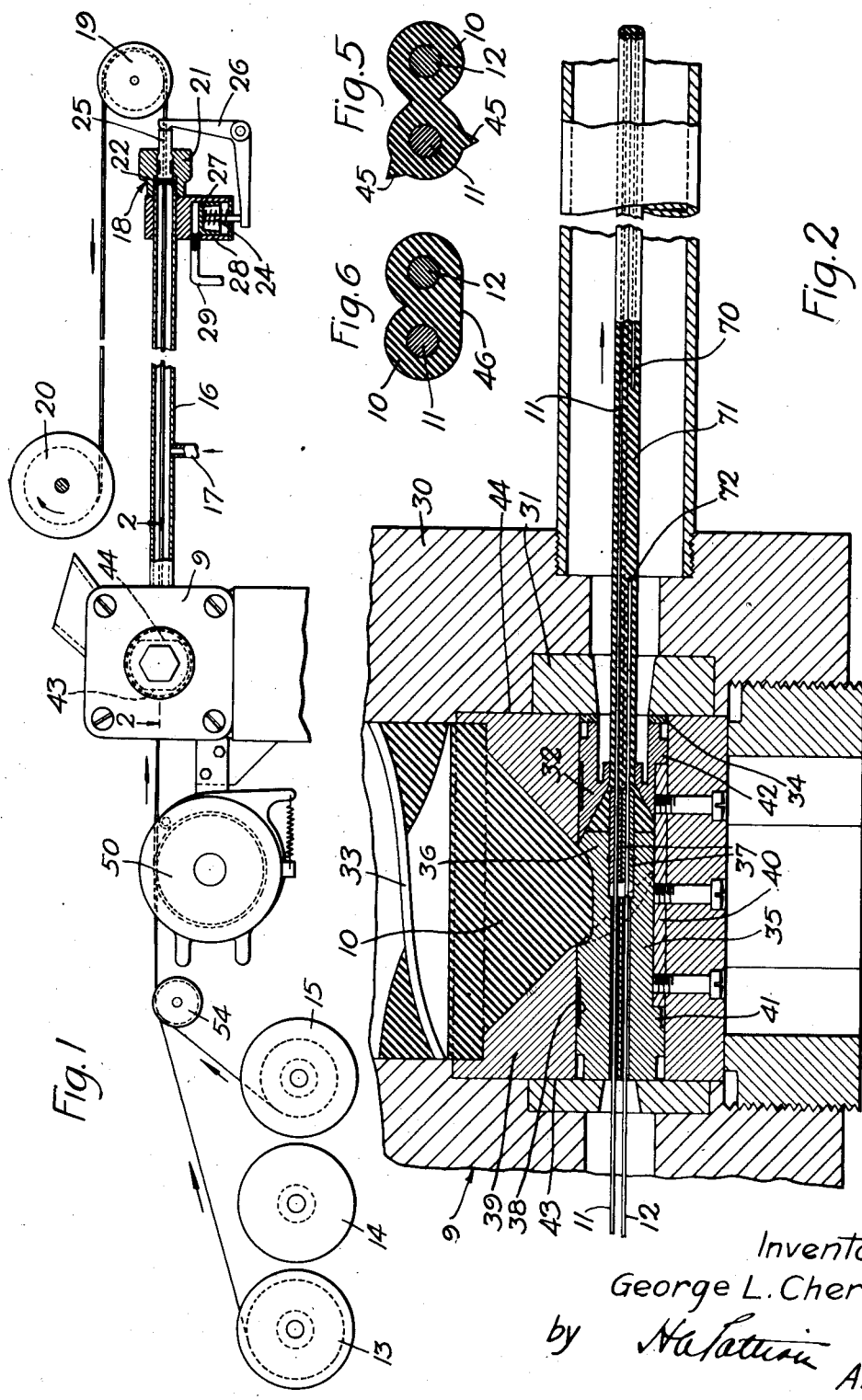
Inventor
George L. Cherry
by _____ Atty.

Sept. 22, 1931.   G. L. CHERRY   1,823,885
METHOD OF AND APPARATUS FOR HANDLING STRAND MATERIAL
Filed April 6, 1929   2 Sheets-Sheet 2
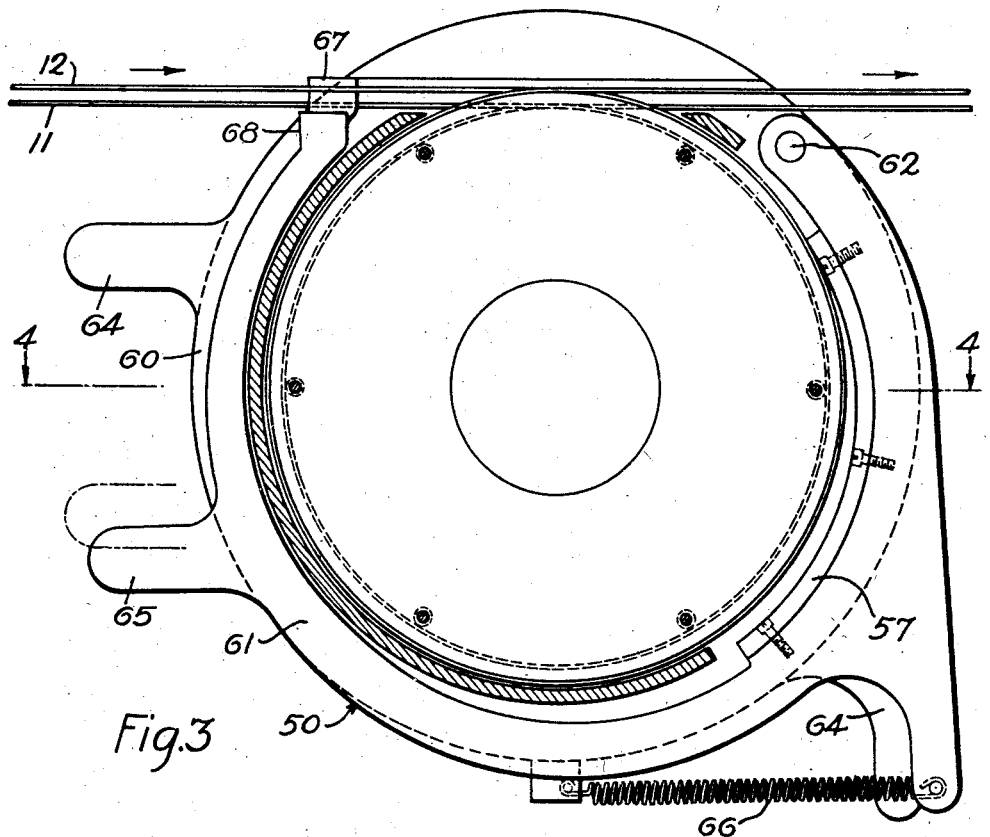
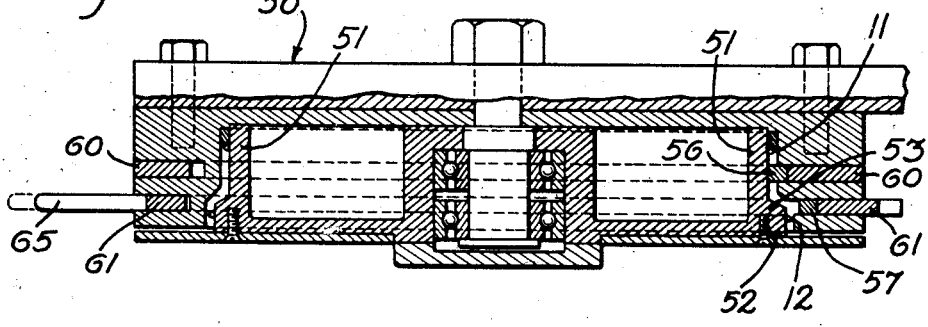
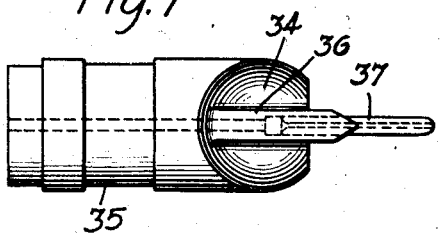
Inventor
George L. Cherry
by *[signature]*
Atty.

Patented Sept. 22, 1931

1,823,885

UNITED STATES PATENT OFFICE

GEORGE LAFAYETTE CHERRY, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR HANDLING STRAND MATERIAL

Application filed April 6, 1929. Serial No. 353,042.

This invention relates to a method of and apparatus for handling strand material, and more particularly to a method of and an apparatus for handling a plurality of moving wires during the process of applying a continuous coating thereto.

The invention is particularly applicable to the handling of moving wires which are in the process of being provided with a common covering of rubber or other insulating substance and are also being vulcanized or otherwise treated in a closed chamber. In such processes a plurality of wires are drawn from supply reels and moved in parallel relation through an extrusion machine where a common insulating covering is applied to them, and are then passed through an elongated chamber where they are subjected to the action of steam or other heating medium to effect a heat treatment of the covering. For example, two parallel wires may be simultaneously passed through the extrusion machine where a coating of rubber compound is applied to them, and then passed in parallel relation through a closed steam chamber to effect vulcanization of the rubber, the steam chamber, at the point where the moving wires emerge, being provided with a suitable seal to prevent leakage of the steam from the chamber.

Objects of this invention are to provide an improved method of and apparatus for expeditiously handling moving strands during the processes of covering and heat treating.

In accordance with the present invention, means is provided whereby when one of the supply reels becomes exhausted of wire the apparatus need not be stopped, but the forward end of the wire from a succeeding reel may be fed into the extrusion machine and drawn through the steam chamber and seal, the covering material serving to connect said forward end with the rear end of the exhausted wire, as well as with the other wire or wires, the wire from the succeeding reel being fed to the machine by a differential capstan at a somewhat increased rate in order to avoid undue tension on the connecting section of covering material. The invention also resides in an improved construction of certain parts of the extrusion machine, as described hereinafter.

The invention will be more fully understood from the following description taken in connection with the appended drawings, in which Fig. 1 is a diagrammatic elevation, partly in section, illustrating a preferred form of apparatus embodying the invention and by means of which the invention may be practiced, Fig. 2 is an enlarged sectional view of the insulating head of the extrusion machine, corresponding to a view taken on the line 2—2 of Fig. 1, Fig. 3 is an enlarged elevational view of the capstan, certain parts being broken away to disclose the interior structure, Fig. 4 is a sectional view taken on the line 4—4 of Fig. 3, Fig. 5 is an enlarged sectional view of a pair of conductors coated by the apparatus shown in Figs. 1 and 2, Fig. 6 is a similar view showing a modified form of the same, and Fig. 7 is a detail view of the core tube assembly.

In the drawings, the reference numeral 9 designates the insulating head of an extrusion machine of any suitable construction adapted to apply a common coating of rubber compound or other material 10 to wires 11 and 12 which pass therethrough from supply reels 13, 14 and 15, the supply reels being so mounted with respect to the extrusion machine that when one reel becomes exhausted the wire from another reel may be threaded into the machine without removing the exhausted reel. From the extrusion machine, the newly coated wires are passed to a chamber 16, where steam or other heating medium is admitted thereto through an inlet 17, the heating medium being maintained under pressure in the chamber. From chamber 16 the coated and heat treated wires pass through a substantially steam-tight seal 18, and thence over a capstan 19 to a take-up reel 20. The capstan 19 is driven, by means not shown, at a predetermined speed which is coordinated with the extruding speed of the insulating head 9.

The seal 18 comprises a threaded cap 21 which holds apertured disks 22, of rubber or other resilient material, against the end of the steam chamber 16. A hollow cylindrical retaining member 25 holds the disks 22 in yielding contact with the coated wires 11 and 12 moving therethrough, to prevent leakage of the steam from the chamber. The retaining member 25 is held in position by a bell-crank lever 26 which is yieldingly urged against the retaining member by means of a piston 27 mounted in a cylinder 28 and actuated by compressed air or other pressure medium admitted through duct 29, the piston being yieldingly urged upwardly by a coiled spring 24.

The rear end of chamber 16 connects, through block 30 (Fig. 2), with a tapered entrance member 31 which bears against a floating coating die 32 of the insulating head 9, a gasket 34, preferably of asbestos fibre saturated with graphite, or of soft copper, aluminum, or other suitable gasket material, being interposed between the entrance member and the die to prevent leakage of steam. A steam-tight seal between the die and the chamber 16 is thereby maintained during the operation of the machine by reason of the die being pressed forwardly against the entrance member by the pressure of the coating material 10 being forced therethrough by a screw 33.

The core tube assembly comprises a member 35 having a concave surface 34 to deflect the insulating material toward die 32, and having a central partition member 36 adapted to divide the stream of insulating material into two portions and thereby evenly distribute the pressure thereof. A pair of core tubes 37 are fixedly mounted within member 36, extending forwardly therefrom, and are shaped to receive wires 11 and 12 and to cooperate with die 32 to form thereon a common insulating covering, which covering is preferably shaped to indicate polarity, by means of spaced, longitudinally extending fins 45 as shown in Fig. 5, or by means of a flattened surface 46, as shown in Fig. 6. Members 32 and 35 are slidably mounted in a cylindrical bore 38 formed in a block 39 of the insulating head, a stop 40 being fixed in the bore to coact with lugs 41 and 42 on the members 32 and 35 to limit their inward movement. Block 39 has a cylindrical outer surface except at opposite faces 43 and 44 which are formed plane in order to align the block 39 accurately within the block 30. In order to prevent the parts from being incorrectly assembled, the face 43 is made slightly smaller than the face 44, as indicated in Fig. 1, while the opposite ends of stop 40 are spaced at different distances from surfaces 43 and 44, respectively, as indicated in Fig. 2. It will thus be seen that the block 39 cannot be inserted within block 30 except in a predetermined position, and that it cannot be so inserted when members 32 and 35 are improperly positioned therein.

A differential capstan 50 is interposed between the supply reels and the insulating head 9 and comprises a rotatable cylindrical portion 51 (Figs. 3 and 4) having an enlarged cylindrical portion 52 formed integral therewith, the two portions being joined by a tapered portion 53. Wires 11 and 12, in their movement to the insulating head 9, pass over a roller 54, (Fig. 1) and thence around the portion 51, the tension imparted to the wires by the capstan 19 serving to frictionally drive the capstan. The wires are so wound about the capstan, as indicated in Fig. 3, that they constantly tend to creep upwardly as viewed in Fig. 4, but are held against such lateral creeping by means of guide shoes 56 and 57 which are mounted on independently movable levers 60 and 61, pivoted at 62 and movable by means of handles 64 and 65, but yieldingly held in their operative position by means of coil springs 66. Levers 60 and 61 also carry at their free ends guide members 67 and 68 designed to cooperate with guide shoes 56 and 57 to prevent the wires from creeping laterally.

In the operation of the machine, two wires are drawn from reels 13 and 14 over roller 54, looped around the portion 51 of capstan 50 and passed through the extrusion machine, which forms thereon an insulating covering. The wires are then drawn through the steam chamber 16 and seal 18, passing over capstan 19 to the take-up reel 20, the distance between capstan 19 and reel 20 being sufficiently great to permit the covering to cool and harden. The arrangement of reels 13, 14 and 15 is preferably such that the wire on a given reel 14 is exhausted when the wire passing from the other reel 13 is about half unwound, thus providing a staggered relation between the wires which prevents both reels from becoming exhausted at the same time. When the wire on reel 14 is exhausted its rear end 70 (Fig. 2) will be drawn through the apparatus, and the extrusion machine will thereafter produce a tube or section of insulation 71 having no wire therein. It has been found experimentally that the tensile strength of such section, reinforced by its being joined to the other wire 11, is ordinarily sufficient to draw the forward end 72 of the succeeding reel 15 forwardly through the chamber 16 and the seal 18 without breaking, provided that the section 71 is not subjected to sudden stress such as is incident to starting a new reel rotating. In order to prevent the occurrence of such sudden stress in section 71, therefore, the forward end of the new wire 12 is looped around the enlarged portion 52 of capstan 50, being held in place thereon by guide shoe 57, and is introduced into the insulating head 9 as quickly as possible after end 70 has passed therethrough, whereupon capstan 50 is rotated solely by the tension in the continuous wire 11, and wire 12 is fed to the machine at a somewhat faster rate than wire 11, due to the larger diameter of portion 52. After the end 72 passes the die 32, the force of the insulating material being extruded is sufficient to advance it independently of the other advancing means so long as slack wire is being fed to the insulating head. By this method, the tension in section 71 is kept at a minimum, and the section will have sufficient strength, even when softened by the heat of the chamber 16, to prevent its being torn from the covering of wire 11. When the section has passed through the greater portion of the steam chamber, it has sufficient strength, due to its being vulcanized, to withstand tensile stresses as well as the other wire 11. When this point is reached, the handle 65 may be depressed as shown in Figs. 3 and 4 to allow the wire 12 to pass laterally onto the cylindrical portion 51.

While the invention has been described with particular reference to a pair of wires having a common covering of rubber and to a steam vulcanizer, it will be readily understood that it may be applied with suitable modifications to the handling of more than two wires, and that it may be applied where wires are to be covered with insulating material other than rubber as well as in various other relations. The scope of the invention is therefore to be limited only by the terms of the following claims.

What is claimed is:

1. A method of handling strand material, comprising continuously advancing a strand along a predetermined path at a predetermined speed, applying a continuous covering to the strand during such advancement, connecting the rear end of the strand to the forward end of a succeeding strand by means of the covering material, and advancing the succeeding strand along the path at a speed differing from the predetermined speed.

2. A method of handling strand material, comprising continuously advancing a plurality of strands in parallel relation along a predetermined path at a predetermined speed, applying a continuous covering to each of the strands during such advancement, connecting the rear end of an exhausted strand to the forward end of a succeeding strand by means of a length of the covering material, and advancing the succeeding strand along the path at a speed differing from the predetermined speed.

3. A method of handling strand material, comprising continuously advancing a pair of strands in parallel relation at a predetermined speed, applying a continuous covering to each of the strands during such advancement, advancing a third strand in longitudinally spaced relation to one of said pair of strands, connecting the third strand to at least one of the pair of strands by means of the covering material, and advancing the third strand at a speed different from the predetermined speed.

4. A method of handling strand material, comprising continuously advancing a plurality of strands in parallel relation along a predetermined path at a predetermined speed, applying a plastic covering to the strands during such advancement, heat treating the applied covering, connecting the rear end of an exhausted strand to the forward end of a succeeding strand by means of the covering material, and advancing the succeeding strand at a faster rate than the predetermined speed.

5. A method of handling strand material, comprising continuously advancing a plurality of strands, applying a common covering to the strands during such advancement, heat treating the applied covering, connecting successive strands together by means of the covering material, and advancing the successive strands at different rates of speed than the preceding strand.

6. A method of handling strand material, comprising advancing a plurality of strands along a predetermined path at a predetermined speed, applying a common covering to said strands during such advancement, subjecting the covered strands to heat and pressure, and drawing a succeeding strand along the path at a faster rate than the predetermined speed.

7. A method of handling strand material, comprising advancing a plurality of strands along a predetermined path at a predetermined speed, applying a common covering to the strands during such advancement, and utilizing the tension in one of the strands to advance the forward end of a strand to the covering means at a faster rate than said predetermined speed.

8. A method of handling strand material, comprising advancing a plurality of strands along a predetermined path at a predetermined speed, applying a common covering to the strands during such advancement, attaching a succeeding strand to one of the plurality of strands by means of the coating material, and utilizing the tension in one of the strands to advance the forward end of the succeeding strand to the covering means at a faster rate than said predetermined speed.

9. An apparatus for handling strand material, comprising means for moving a plurality of strands in parallel relation at a predetermined speed, means for applying a continuous covering to each of the strands at one point along said path, and means utilizing the tension in one of the strands to advance the forward end of a strand to the covering means at a faster rate than said predetermined speed.

10. An apparatus for handling strand material, comprising means adapted to apply a common covering to a plurality of strands, and means driven by a movement of one of the strands for advancing another of the strands to the first mentioned means at a speed greater than that of the first mentioned strand.

11. An apparatus for handling strand material, comprising mechanism adapted to apply a common covering of plastic material to a plurality of strands, means for drawing the strands through the mechanism at a predetermined speed, and means actuated by one of the moving strands for advancing another of the moving strands to the mechanism at a speed higher than the predetermined speed.

12. An apparatus for handling strand material, comprising extrusion mechanism adapted to apply a common covering to a plurality of strands, means for drawing the strands through the mechanism at a predetermined speed, and a differential capstan driven by one of the moving strands and adapted to advance another of the moving strands to the mechanism at a speed higher than the predetermined speed.

13. An apparatus for handling strand material, comprising an extrusion mechanism adapted to apply a covering to a plurality of moving strands, and a capstan adapted to be rotated by the moving strands and comprising a cylindrical portion and an enlarged portion, and releasable means for preventing lateral movement of the wires on the cylindrical portion and the enlarged portion.

14. A method of handling strand material, comprising continuously advancing a strand at a predetermined speed, connecting the strand to a succeeding strand, and advancing the succeeding strand at a speed differing from the predetermined speed.

15. A method of handling strand material, comprising continuously advancing a strand along a predetermined path at a predetermined speed, connecting the rear end of the strand to the forward end of a succeeding strand, and advancing the succeeding strand along the path at a speed differing from the predetermined speed.

16. A method of handling strand material, comprising continuously advancing a strand at a predetermined speed, and utilizing the tension of the strand to advance a second strand at a speed differing from the predetermined speed.

17. A method of handling strand material, comprising advancing a strand at a predetermined speed, connecting a second strand to the first strand, and utilizing the tension of a third strand to advance the second strand at a speed differing from the predetermined speed.

18. A method of handling strand material, comprising continuously advancing a plurality of strands along a predetermined path at a predetermined speed, connecting the rear end of one of the strands to the forward end of a succeeding strand, and utilizing the tension of another of the strands to advance the succeeding strand along the path at a faster rate of speed than the predetermined speed.

19. An apparatus for handling strand material, comprising means for advancing a strand at a predetermined speed, and means actuated by said strand for advancing a second strand at a speed differing from the predetermined speed.

20. An apparatus for handling strand material, comprising means for advancing a strand at a predetermined speed, and means utilizing the tension of the moving strand for advancing a second strand at a speed differing from the predetermined speed.

21. An apparatus for handling strand material, comprising means for advancing a plurality of strands, means for treating the advancing strands, and means driven by a movement of one of the strands for advancing another strand at a speed differing from that of the first mentioned strand.

22. An apparatus for handling strand material, comprising means adapted to apply a common covering to a plurality of strands, and means driven by a movement of one of the strands for advancing another of the strands to the first mentioned means at a speed differing from that of the first mentioned strand.

In witness whereof, I hereunto subscribe my name this 25th day of March, A. D. 1929.

GEORGE LAFAYETTE CHERRY.